(12) United States Patent
Dettling et al.

(10) Patent No.: US 9,254,732 B2
(45) Date of Patent: Feb. 9, 2016

(54) ARRANGMENT OF A SIDE DOOR ON A BODY OF A MOTOR VEHICLE

(75) Inventors: Gerald Dettling, Rottenburg (DE);
Michael Eggersdorfer, Leonberg (DE);
Wolfgang Fassnacht, Speyer (DE);
Holger Kerschagel, Waiblingen (DE)

(73) Assignee: Daimler AG, Stuttgart (DE)

( * ) Notice: Subject to any disclaimer, the term of this patent is extended or adjusted under 35 U.S.C. 154(b) by 142 days.

(21) Appl. No.: 14/117,487

(22) PCT Filed: Apr. 5, 2012

(86) PCT No.: PCT/EP2012/001510
§ 371 (c)(1),
(2), (4) Date: Dec. 17, 2014

(87) PCT Pub. No.: WO2012/156008
PCT Pub. Date: Nov. 22, 2012

(65) Prior Publication Data
US 2015/0097390 A1    Apr. 9, 2015

(30) Foreign Application Priority Data

May 14, 2011    (DE) .......................... 10 2011 101 533

(51) Int. Cl.
*B60J 5/04*    (2006.01)
(52) U.S. Cl.
CPC .............. *B60J 5/0458* (2013.01); *B60J 5/0427* (2013.01); *B60J 5/0451* (2013.01)
(58) Field of Classification Search
CPC ...... B60J 5/0427; B60J 5/0443; B60J 5/0444; B60J 5/0447; B60J 5/0445; B60J 5/0448; B60J 5/0456; B60J 5/0458; B60J 5/0412; B60J 5/04

USPC ........................ 296/187.12, 146.5, 146.6, 209
See application file for complete search history.

(56) References Cited

U.S. PATENT DOCUMENTS

| | | | | |
|---|---|---|---|---|
| 5,255,953 | A  * | 10/1993 | Frank | 296/146.6 |
| 6,164,716 | A  * | 12/2000 | Palazzolo et al. | 296/187.12 |
| 6,390,533 | B1 * | 5/2002 | Furuse | 296/146.5 |
| 7,607,719 | B2 | 10/2009 | Abraham et al. | |
| 7,735,264 | B2 * | 6/2010 | Rieder et al. | 49/502 |
| 2003/0189357 | A1 * | 10/2003 | Patberg et al. | 296/146.6 |

(Continued)

FOREIGN PATENT DOCUMENTS

| | | |
|---|---|---|
| EP | 1 203 678 A2 | 5/2002 |
| WO | WO 2005/087572 A1 | 9/2005 |

OTHER PUBLICATIONS

International Search Report dated Jun. 25, 2012 with English translation (four (4) pages).

(Continued)

*Primary Examiner* — Gregory Blankenship
(74) *Attorney, Agent, or Firm* — Crowell & Moring LLP

(57) ABSTRACT

An arrangement of a side door on a body of a motor vehicle is provided. The side door is held on the body in a closed position that closes a door opening corresponding to the side door with respect to the transverse direction of the vehicle with at least regional overlapping with a side sill of the body. The side door has a reinforcing element, with which the side door can be supported on the side sill in the event of an application of force, caused by an accident, acting on the side door from the outside in at least substantially in the transverse direction of the vehicle.

5 Claims, 2 Drawing Sheets

(56) References Cited

U.S. PATENT DOCUMENTS

Figure 1:
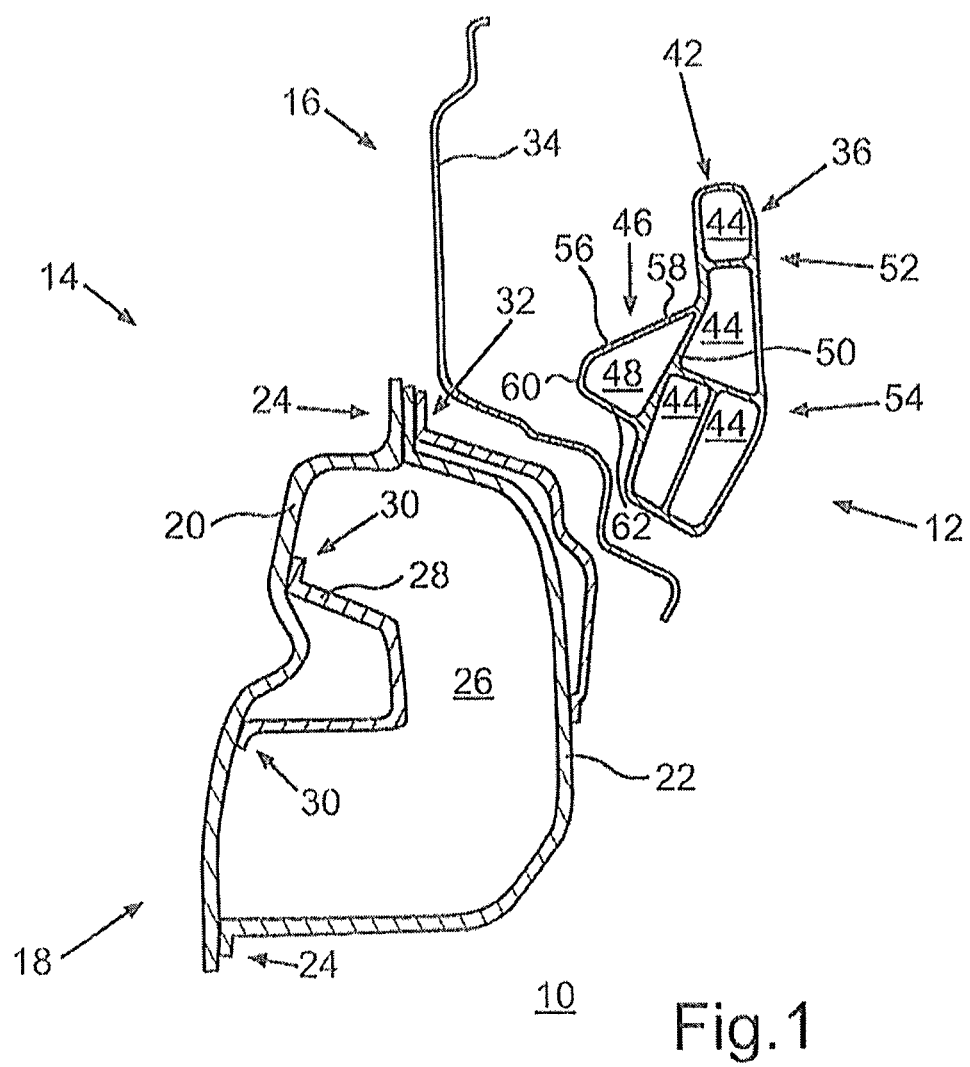

| | | | |
|---|---|---|---|
| 2009/0184501 A1* | 7/2009 | Hirotani | 280/730.2 |
| 2010/0060031 A1* | 3/2010 | Duguet et al. | 296/187.12 |
| 2013/0168997 A1* | 7/2013 | Kurokawa et al. | 296/146.6 |
| 2015/0097390 A1* | 4/2015 | Dettling et al. | 296/146.6 |

OTHER PUBLICATIONS

German-language Written Opinion (PCT/ISA/237) dated Jun. 25, 2012 (five (5) pages).

* cited by examiner

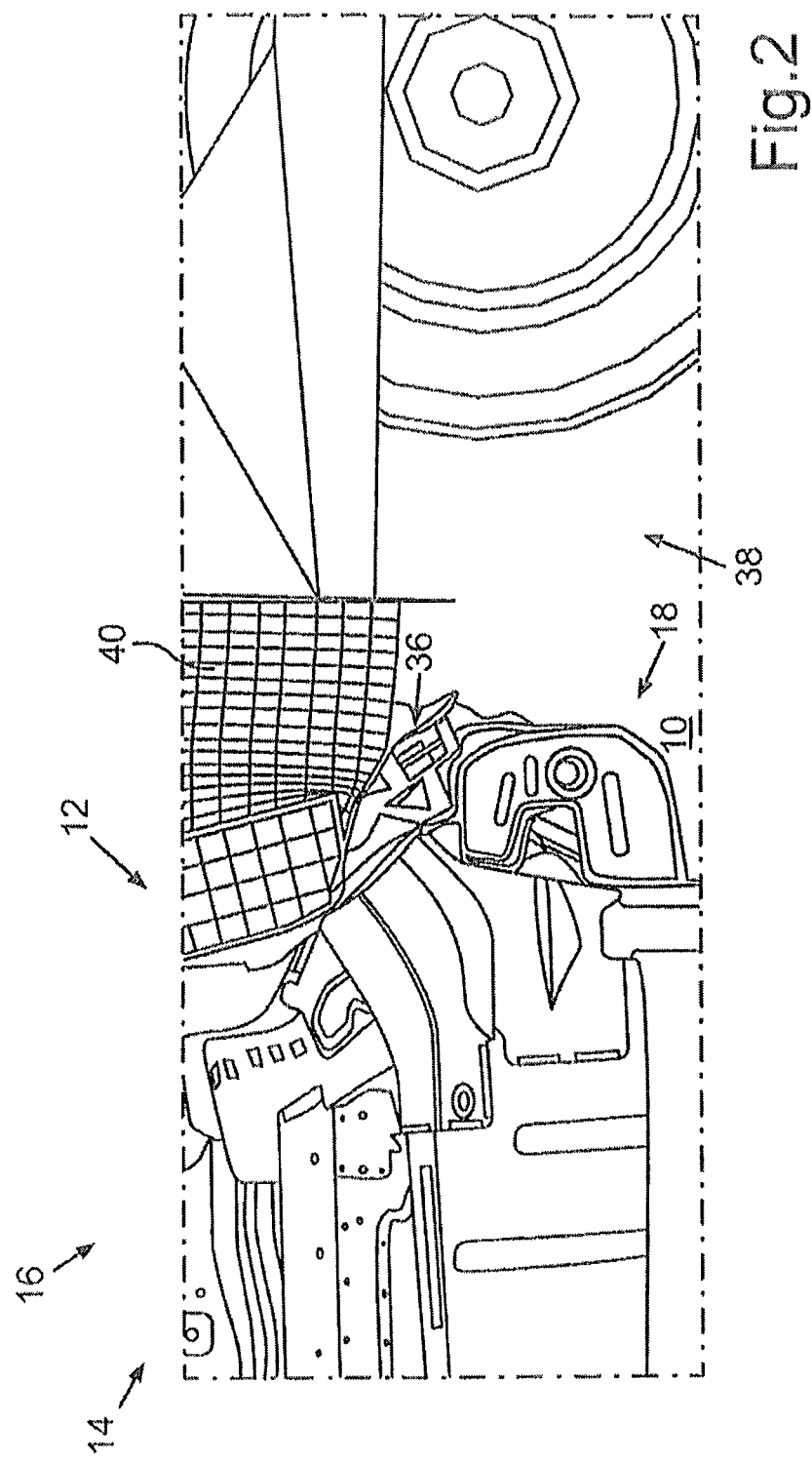

ARRANGMENT OF A SIDE DOOR ON A BODY OF A MOTOR VEHICLE

BACKGROUND AND SUMMARY OF THE INVENTION

Exemplary embodiments of the present invention relate to an arrangement of a side door on a body of a motor vehicle.

Arrangements of side doors on corresponding bodies of motor vehicles, in particular personal motor vehicles, are known from the series construction of motor vehicles, wherein the respective side door is arranged in the transverse direction of the vehicle with at least regional overlapping with a side sill of the body that extends at least substantially in the longitudinal direction of the vehicle, with respect to a closed position of the side door, in which a door opening corresponding to the side door is closed.

It has been shown that, in such conventional arrangements of side doors on corresponding bodies, when there is an application of force on the side door, caused by an accident, which force at least substantially runs in the transverse direction of the vehicle and acts on the side door from the outside in, can lead to the side door being "pushed over" the side sill if no corresponding countermeasures are taken.

In accordance with exemplary embodiments of the present invention, in such an arrangement of a side door on a body of a motor vehicle, in particular a personal motor vehicle, the side door is held to the body in the transverse direction of the vehicle with at least regional overlapping with a side sill of the body, with respect to a closed position of the side door, in which a door opening corresponding to the side door is closed. In other words, the side door is arranged with at least regional overlapping with the side sill with respect to the transverse direction of the vehicle, at least when the side door is closed. Here, the side door, in particular a door part of the side door, overlaps the side sill at least regionally on the surface with respect to the transverse direction of the vehicle.

According to the invention, the side door is provided with at least one reinforcing element, via which the side door, in particular in the overlap region, can be supported on the side sill when there is an application of force on the side sill, caused by an accident, which force at least substantially runs in the transverse direction of the vehicle and acts on the side door from the outside in. If this application of force caused by an accident occurs as portrayed, for example as a result of a side impact of a barrier or vehicle on the side door, the side door can be supported on the side sill, in particular via a door part of the side door and the reinforcing element. The side door, in particular its door part, is thus not pushed at all, or not pushed to an undesirable distance away, inwardly in the transverse direction of the vehicle via the side sill and thus does not penetrate the passenger space of the motor vehicle to an undesirable extent. A very good level of side impact protection is thus achieved, whereby vehicle passengers can be protected from serious injuries.

In particular when there is a so-called pole impact, wherein a pole strikes the side door from the outside as a barrier, this leads to the application of force portrayed, which is usually caused by an accident and at least substantially acts in the transverse direction of the vehicle from the outside onto the side door. When there is side impact the reinforcing element to be supported on the side sill preferably extends at least substantially in the longitudinal direction of the vehicle, in particular on an entry flange of the side sill, and for it is wedged on the side sill.

Provision is furthermore preferably made for, when there is side impact, the reinforcing element to be screwed in around an axis of rotation that runs at least substantially in the longitudinal direction of the vehicle and for it to thus be supported particularly advantageously on the side sill and to be wedged on the side sill. Thus, the door being "pushed over", i.e. there being an undesirably deep penetration into the passenger space, can be avoided and a passenger sitting close to the side door can be protected from serious injuries.

It is thus possible to embody relatively large radii of the side door in order to be able to produce the side door in a timely and cost-effective manner. This is then particularly advantageous if the side door is formed at least substantially from a light metal, in particular from aluminium or from a light metal alloy (aluminium alloy). In this case, the side door comprises an inner door part formed at least substantially from the light metal or light metal alloy (aluminium or aluminium alloy), which can be formed with the relatively large radii described above.

Furthermore, as a result of the support of the side door or inner door part provided by the reinforcing element, during the application of force caused by an accident, it is possible to keep the overlap of the side door with the side sill particularly small. This creates an additional degree of freedom and thus a higher level of flexibility for the configuration of the side door. In this respect, the desired design can be implemented without interfering with the technical properties, in particular the security properties. At the same time, the portrayed advantageous accident performance of the side door can be implemented.

Further advantages, features and details of the invention arise from the description of a preferred exemplary embodiment below, as well as with the aid of the figure.

The features and combinations of features cited above, as well as the features and combinations of features specified in the description of the figures and/or in the figures alone below, can be used not only in the combination specified in each case, but also in other combinations or on their own without exceeding the scope of the invention.

BRIEF DESCRIPTION OF THE DRAWING FIGURES

In the drawing is shown:

FIG. 1 in sections, a schematic sectional view of an arrangement of a side door on a body of a personal motor vehicle, wherein the side door is held on the body in the transverse direction of the vehicle with regional overlapping with a side sill of the body, wherein the side door is provided with a reinforcing element, via which the side door is supported in the case of an application of force on the side sill that is caused by an accident and that acts on the side door in the transverse direction of the vehicle from the outside in;

FIG. 2 in sections, a further schematic sectional view of the arrangement according to FIG. 1 during the application of force on the side door, caused by an accident, as a result of contact by a barrier on the side door from the outside.

DETAILED DESCRIPTION

FIG. 1 shows an arrangement 10 of a side door 12 on a body 14 of a personal motor vehicle. In this instance, the side door 12 can be held rotatably to the body 14 around an axis of rotation relative to the body 14, wherein the body has a door opening 16 corresponding to the side door 12. Due to this ability to rotate, it is possible to swivel the side door 12 between a closed position that closes the door opening 16 and at least one open position relative to the body 12, which releases the door opening 16 at least in regions. FIGS. 1 and 2 thus show the side door 12 in their closed position that closes the door opening 16.

A side sill 18 of the body 14 is also shown in FIG. 1. The side sill 18 is a longitudinal side element of the body 14 extending, at least substantially, in the longitudinal direction of the vehicle. The side sill 18 is formed in the monocoque design and comprises a first shell part 20 and a second shell part 22, which are joined, in particular spot welded, to each other via respective joining flanges 24. Here, the shell parts 20 and 22 are joined together with the formation of a hollow cross-section 26 of the side sill 18. A further shell part 28 is arranged in the hollow cross-section 26, which has joining flanges 30. The further shell part 28 is connected to the first shell part 20 via the joining flanges 30. The shell part 28 thus functions as a reinforcing element of the side sill 18 to ensure a high level of rigidity.

The side sill 18 is, for example, formed at least substantially from metal, in particular from steel, has a high level of rigidity and thus ensures a high level of rigidity of the entire body 14. The side sill 18 has a so-called entry flange 32, via which a passenger space of the personal motor vehicle can be accessed through the door opening 16.

From the side door 12, a door interior trim part 34 is depicted in FIG. 1, which is held, for example, at least indirectly on a door shell of the side door 12 and by means of which the door shell is covered in the direction of the passenger space. The door shell of the side door 12 thus has, for example, an inner door part that can be formed from a light metal, in particular aluminium. The door interior trim part 34 is thus formed, for example, from a plastic and ensures an optically appealing and high-quality impression of the side door 12 in the interior of the vehicle.

As can be further appreciated from FIG. 1, the side door 12 is arranged with at least regional overlapping with the side sill 18 of the body 14 in the transverse direction of the vehicle and at least with respect to the closed position of the side door 12. This means that the side door 12 overlaps the side sill 18 on the surface in the transverse direction of the vehicle in certain regions, in particular in the region of the entry flange 32.

The side door 12 is provided with a reinforcing element 36, which, for example, is held at least indirectly on the inner door part or is connected thereto. As will be appreciated in connection with FIG. 2, the side door 12 can be supported by the reinforcing element 36 when there is an application force on the side sill at least in some regions, in particular on the entry flange 32, which force is caused by an accident and acts on the side door from the outside in at least substantially in the transverse direction of the vehicle.

Such an application of force caused by an accident is illustrated schematically in FIG. 2 by a barrier 38. The barrier 38 comprises an impact part 40, above which the barrier 38 rests during the application of force on the side door 12 caused by an accident. As will be appreciated from FIG. 2, the side door 12 is deformed inwardly at least substantially in the transverse direction of the vehicle during the application of force caused by an accident. Here, however, the side door 12 is prevented from being pushed over the side sill 18 in an undesirable manner. The side door 12 is supported by the reinforcing element 36 on the side sill 18 during the application of force caused by an accident, such that the side door 12 cannot penetrate the passenger space to an undesirable extent.

The reinforcing element 36 is thus formed from steel, for example, and thus has a high level of rigidity and strength. Provision can also be made for the reinforcing element 36 to be designed as an extruded section. It is also possible for the reinforcing element 36 to be formed in a sheet monocoque design and/or at least substantially from a composite material. In particular, the reinforcing element 36 can be formed at least substantially from a fibre-reinforced, in particular carbon-fibre-reinforced, plastic.

Furthermore, the reinforcing element 36 is designed as a multi-chamber profile and comprises a first chamber part 42 with hollow chambers 44 and a second chamber part 46 with a hollow chamber 48. The second chamber part 46 is in this instance designed as a protrusion of the first chamber part 42 running in the direction of the side sill 18. In other words, the second chamber part 46 is a cantilever, a nose or suchlike, which extends at least substantially in the transverse direction of the vehicle from the first chamber part 42 in the direction of the side sill 18.

The hollow chamber 48 is thus delineated in certain regions by an inner wall 50 of the reinforcing element 36, wherein two of the hollow chambers 44 of the first chamber part 42 are also delineated by the inner wall 50. This means that the inner wall 50 is mutual to the hollow chamber 48 of the second chamber part 46 and the hollow chambers 44 of the first chamber part 42.

As can be furthermore appreciated from FIG. 1, the reinforcing element 36 has a first hollow cross-section region 52 and a second hollow cross-section region 54 that connects from below to the first hollow cross-section region 52 in the vertical direction of the vehicle. Here, the hollow cross-section regions 52 and 54 have an angle that differs by 180°. In other words, based on the first hollow cross-section region 52, the second hollow cross-section region 54 runs at a curved and/or bent angle to the first hollow-section region 52, wherein the second hollow cross-section region 54 extends at least substantially in the direction of the side sill 18 and thus inwardly in the transverse direction of the vehicle. Here, a wall 56 bordering the hollow chamber 48 of the second chamber part 46 is arranged in the second hollow cross-section region 54.

The reinforcing element 36 is thus arranged with respect to the vertical direction of the vehicle in a lower region and therefore in a so-called door floor region of the side door 12 and reinforces this door floor region. Due to this arrangement of the reinforcing element 36 and the shape or configuration thereof, the reinforcing element 36 is screwed in during the application of force caused by an accident, such that the second chamber part 46 rotates around an axis of rotation that runs at least substantially in the longitudinal direction of the vehicle in the direction of the side sill 18 or the entry flange 32. Thus, the reinforcing element 36 can rest on the side sill 18 and be wedged into it, such that the side door 12 is prevented from being pushed over the side sill 18 undesirably far.

Thus, the inner door part, in particular when formed from aluminium, can be produced with relatively large radii. Furthermore, a particularly small overlap of the side door 12, in particular a door leaf of the side door 12, with the side sill 18 in the transverse direction of the vehicle is possible, which guarantees creative freedom with respect to the design of the side door 12.

The wall 56 has a first longitudinal region 58, which runs at an angle to the transverse direction of the vehicle, for the implementation of the support and the advantageous accident performance of the side door 12. A second longitudinal region of the wall 56 connects to the first longitudinal region 58, wherein the longitudinal regions 58 and 60 have an angle that differs by 180° and wherein the second longitudinal region 60 runs at least substantially in the vertical direction of the vehicle and extends in the direction of the side sill 18. A third longitudinal region 62 of the wall 56 connects to the second longitudinal region 60, which extends away from the side sill 18 based on the second longitudinal direction 60 and runs at least substantially at an angle to the transverse direction of the vehicle and to the vertical direction of the vehicle and, with the second longitudinal region 60, has an angle that differs by 180°. From this, it is clear that the hollow chamber 48 of the second chamber part 46 is on the one hand delineated by the wall 56 with the longitudinal regions 58, 60 and 62 and on the other by the inner wall 50.

The second chamber part 46 thus functions as a cantilever or nose for the first chamber part 42, such that the reinforcing element 36 advantageously supports the entry flange 32 of the side sill 18 and thus the side door 12 is prevented from penetrating the passenger space to an undesirably great extent. Thus, the undesirable pushing over of the side door 12 can be prevented, in particular compared to a plate doubler used as reinforcement in the door floor profile, such that the arrangement 10 has advantageous accident performance compared to the plate doubler.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An arrangement, comprising:
   a motor vehicle body; and
   a side door on the motor vehicle body,
   wherein the side door is held on the motor vehicle body in a closed position that closes a door opening corresponding to the side door with respect to a transverse direction of the motor vehicle with at least regional overlapping with a side sill of the motor vehicle body,
   wherein the side door includes at least one reinforcing element, with which the side door is supported on the side sill in event of an application of force, caused by an accident, that acts on the side door from outside at least substantially in the transverse direction of the vehicle,
   wherein the reinforcing element has a first chamber part having a hollow chamber and at least one second chamber part having a further hollow chamber, wherein a vertically running wall extending across an entirety of the at least one second chamber part separates the first chamber part from the at least one second chamber part, and wherein an entirety of the at least one second chamber part is disposed on a side of the wall that faces toward the side sill.

2. The arrangement according to claim 1, wherein the reinforcing element has a first hollow cross-section region and at least one second hollow cross-section region that connects to the first hollow-cross section region in a vertical direction of the vehicle, wherein the first and second hollow cross-section regions have an angle to each other that is not 180 degrees.

3. The arrangement according to claim 1, wherein the reinforcing element is an extruded section.

4. The arrangement according to claim 1, wherein the reinforcing element has a sheet monocoque design.

5. The arrangement according to claim 1, wherein the reinforcing element is a fiber-reinforced composite component.

* * * * *